Nov. 12, 1940.   J. D. MINER, JR   2,221,599
SHAVER-TYPE MOTOR
Filed Jan. 10, 1940
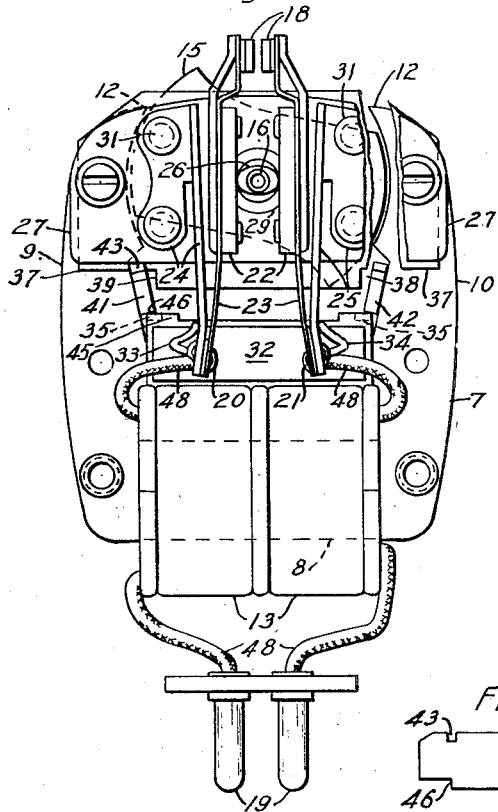
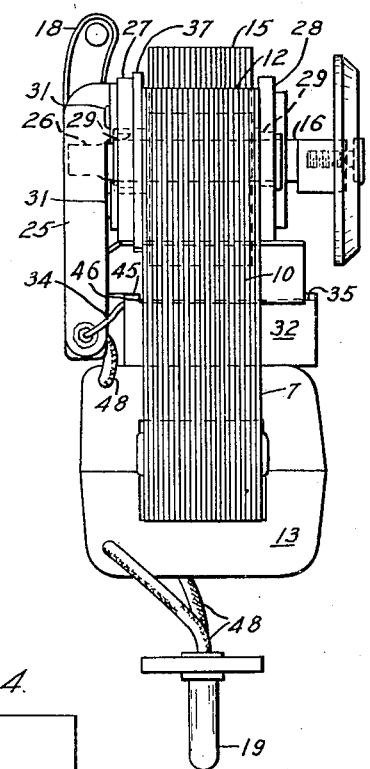
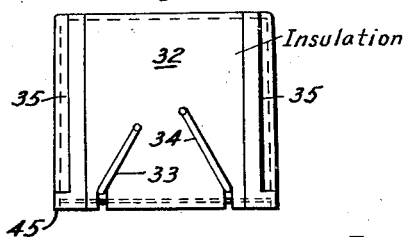
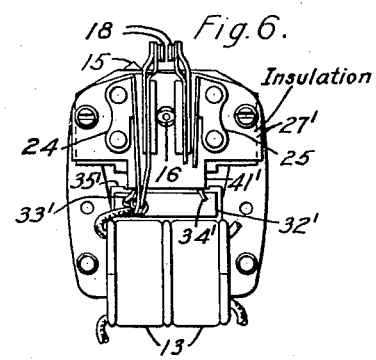
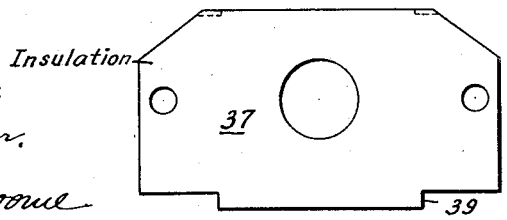
INVENTOR
John D. Miner, Jr.
BY O. B. Buchanan
ATTORNEY Patented Nov. 12, 1940

2,221,599

UNITED STATES PATENT OFFICE 2,221,599

SHAVER-TYPE MOTOR

John D. Miner, Jr., Lima, Ohio, assignor to Westinghouse Electric & Manufacturing Company, East Pittsburgh, Pa., a corporation of Pennsylvania Application January 10, 1940, Serial No. 313,247

5 Claims. (Cl. 172—36)

My invention relates to vibrating-contact motors of a type which have become common in some kinds of electrical shavers, or so-called dry-shavers. These motors utilize cam-operated contacts which are shunted by small capacitors which have heretofore involved insulating and mounting-means aggregating over 5% of the motor-cost, in order to acceptably insulate the capacitor-leads from the motor-frame, and to adequately secure the capacitor in place in such a compact assembly.

The principal object of my present invention is to provide improved insulating wedging-means for holding the capacitor in place and/or insulating its leads from the motor-frame.

With the foregoing and other objects in view, my invention consists in the parts, combinations, structures and methods hereinafter described and claimed and illustrated in the accompanying drawing, wherein:

Figure 1 is an enlarged double-scale plan-view showing a shaver-motor embodying my invention in one form of embodiment thereof, with some of the parts broken away to show the construction, Fig. 2 is a side view of the motor shown in Fig. 1, Fig. 3 is a plan view of the face of the capacitor utilized in the motor shown in Figs. 1 and 2, Fig. 4 is a plan view of one of the fish-paper wedging-members utilized in the motor shown in Figs. 1 and 2, Fig. 5 is a plan view of an insulating separator utilized in the motor shown in Figs. 1 and 2, and Fig. 6 is a plan view of a modified form of motor embodying my invention in a slightly different form.

The motor shown in Figs. 1 and 2 comprises a U-shaped bipolar field-magnet core 7 comprising a bight-portion 8 and two side-arms 9 and 10 extending at approximately right angles from the respective ends of the bight-portion, each side-arm terminating in a pole face member 12. A field-magnet coil 13, illustrated as a two-part coil, is wound upon the bight-portion 8 of the field core. The rotor member of the motor comprises a bipolar armature 15 mounted on a shaft 16 and disposed in operative position between the pole-face members 12.

The bipolar shape of the rotor-armature 15 gives the armature such magnetic characteristics that the torque produced by the action of the field-poles 12 on the armature would be alternately clockwise and counterclockwise if the armature were rotated while the field-magnet coil 13 was continuously energized. To periodically interrupt the energization of the field-coil 13, a pair of contacts 18 are electrically connected in series-circuit relation to the coil 13, so as to be included in the circuits which are energized from the coil-terminals 19. In the preferred form of construction, as illustrated, the contacts 18 are connected between the two halves of the field-coil 13, as indicated at 20 and 21. In their mechanical construction, the pair of contacts 18 comprise a pair of contact-arms 22 which are disposed on opposite sides of the rotor-shaft 16, and these contact-arms are supported by springs 23 which are carried by suitable mounting-fixtures 24 and 25. The shaft 16 is provided with a cam 26 which engages the contact-arms 22 to control the contacts in such relation to the relative positions of the armature 15 with respect to the field-poles 12 that the contacts 18 are opened at times when the torque would otherwise be negative with respect to a desired direction of rotation.

The rotor-shaft 16 is supported by means of two cross-pieces 27 and 28 which join the two pole-face members 12, one cross-piece extending across each side of the pole-face members. The two cross-pieces 27 and 28 carry bearing-members 29 which engage the shaft 16 on opposite sides of the armature 15. The cross-pieces 27 and 28 are preferably made of material which is both non-magnetic and insulating. Particularly, the front cross-piece 27 is preferably made of insulating material and is utilized as a means for supporting the contact-supporting brackets 24 and 26, these brackets being connected to the cross-piece by means of rivets 31.

Motors of the type so far specifically described are commonly provided with a capacitor 32 which is disposed in the space between the two field-magnet side-arms 9 and 10, and between the field-coil 13 and the motor-armature 15. Electrically, the capacitor 32 is connected in a circuit in parallel to the contacts 8, as indicated by the capacitor-leads 33 and 34. The particular capacitor shown in Figs. 1, 2 and 3 is a capacitor utilizing a paper dielectric (not shown), and enclosed in a molded insulating casing, the top surface of which is provided with molded projections 35 as shown in Fig. 3, for a purpose to be subsequently described. The capacitor 32 which I have shown is of an unusually large size, for motors of this class, being several times larger than the small mica capacitors which were previously utilized for a similar purpose. The specially molded casing of the capacitor 32, with its projections 35, is also a special feature of my present invention.

As a particular feature of my invention, I provide means for economically mounting and/or insulating the capacitor 32 and its terminal-leads 33 and 34. In the form of my invention shown in Figs. 1 and 2, this capacitor-mounting means makes use of a thin, auxiliary, insulating separator 37 which is disposed between the contact-bearing cross-piece 27 and the stator-core 7. This auxiliary insulating separator 37 performs the double duty of insulating the heads of the contact-bracket rivets 31 from the stator-frame 7, and also providing a convenient means for producing a notch 38 on the inner edge of the composite cross-piece means which includes the cross-piece 27 and the separator 37. The notch 38 is formed by means of a shoulder 39 which is provided on the inner edge of the insulating separator 37 at a point close to the inside face of each of the two side-arms 9 and 10 of the field-magnet core.

Cooperating with the two notches 38 is an insulating barrier-means or wedging-means which, in the form of embodiment shown in Figs. 1, 2 and 4, comprises two sheets 41 and 42 of stiff fish-paper or other insulating-material, one of the two sheets lying in juxtaposition to the inside face of each of the side-arms 9 and 10 of the field-magnet core, and occupying at least a portion of the surface between the field-magnet coil 13 and the inner edges of the two cross-pieces 27 and 28. In the form of the invention which is shown in Figs. 1 and 2, the insulating barrier-sheets 41 and 42 are utilized as wedges for wedging the capacitor 32 down against the top of the field-magnet coil 13, and away from the inner edges of the cross-pieces 27 and 28, and hence away from the rotor-armature 15, thus avoiding the possibility of the rotor-armature striking the top of the capacitor 32. The fish-paper wedges 41 and 42 are of a proper width or height so that they extend from the top face of the capacitor 32 to the two notches 39 which are provided at the inner edge of the cross-piece assembly 27—37, and the top edges of the wedges 41 and 42 are themselves notched, as indicated at 43, so as to engage the cross-piece or the separator 37, and thus to prevent displacement of the wedges.

The wedges 41 and 42 are prevented from slipping, on the top surface of the capacitor 32, by means of the projections 35 which are molded in the top surface of the capacitor, a rear-projection 45 being also provided, on the capacitor 32, to cooperate with a corresponding notch 46 on the wedges 41 and 42, to prevent lateral displacement of the capacitor 32 in one direction, while displacement in the other direction is prevented by the presence of the contact-structure 18 and the inner coil-terminals 20 and 21.

In operation, the motor operates practically equally well on either alternating current or direct current, and achieves high speeds, much higher than the synchronous 60-cycle speed. The capacitor 32 is of such size and internal resistance-characteristics (because of its paper dielectric) as to provide substantially arc-less contact-separation, the particular capacitor shown being a .015 microfarad capacitor for a 110-volt motor taking about 7 watts. This capacitor is much larger than the largest-size mica-dielectric (or low-resistance) capacitor which could previously be utilized for this size of motor, and hence my capacitor 32 is somewhat crowded for space.

It will be noted that my insulating barriers or wedges 41 and 42 not only wedge the capacitor 32 in place, out of possible incidental contact with the revolving rotor-armature 15, but they also make it possible to omit the insulating tubing which was heretofore required on the capacitor-terminals 33 and 34, similar to the tubing 48 which is shown on the terminals of the coil 13. Experience has shown that such insulating tubing was particularly objectionable, when placed on the capacitor-connections or terminals 33 and 34, because of the difficulties of soldering the connections to the end of the contact-carrying springs 23 without burning said insulating tubing, and also because of difficulties involved in the necessary bending of the capacitor-terminals 33 and 34. The insulating wedges or barriers 41 and 42 are sufficiently thick to meet the Underwriters requirements as to insulation, so that the customary tubular insulators on the wire terminals 33 and 34 can be omitted. At the same time, these insulating wedges or barriers 41 and 42 dispense with the necessity for tying the capacitor to the coil 13, as was done in previous motors which my present design has superseded, and which involved a cost which was a sufficiently large percentage of the total cost of these small motors to be very worth while saving.

The principle of utilizing insulating and wedging barriers is susceptible of embodiment in several different modifications, a second form of embodiment being illustrated in Fig. 6, wherein the top and bottom cross-pieces or bearing-plates 27' are provided with integral, downwardly extending projections 41', which engage within protuberances 35' on the top of the capacitor 32'. Interference between the capacitor 32' and the rotor 15 is positively prevented by making the distance from the bearing projections 41' greater than the center-line to the end of the radius of the rotor. These wedging projections 41', being made of insulating material, also serve to insulate the capacitor-terminals 33' and 34', which are bent out around these wedging projections so as to be insulated thereby. In general, it will be sufficient to hold the capacitor in place by friction against the coil 13. If desired, a bead 35' at the top front edge of the capacitor 32' may be used to positively retain the capacitor in position, said bead resting above the edge of the projection 41' of the top bearing-plate 27'.

While I have shown my invention in only two different alternative forms of embodiment thereof, I wish it to be understood that my invention is not limited to these precise forms, as many changes may obviously be made by those skilled in the art without essentially departing from all of the features of my novel arrangement for mounting, supporting and insulating the various parts of these small motors. I desire, therefore, that the appended claims shall be accorded the broadest construction consistent with their language and the prior art.

I claim as my invention:

1. A vibrating-contact motor comprising a U-shaped bipolar field-magnet core comprising a bight-portion and two side-arms extending at approximately right angles from the respective ends of the bight-portion, each side-arm terminating in a pole-face member, a field-magnet coil wound upon said bight-portion, a shaft-mounted rotor-armature disposed in operative position between said pole-face members, said rotor-armature being of such magnetic characteristics, and so positioned with respect to said pole-face members, that the torque produced by the action of the field-poles on the armature would be alternately clockwise and counterclockwise if the armature were rotated while the field-magnet coil was continuously energized, a pair of contacts electrically connected in series-circuit relation to the field-magnet coil and mechanically comprising a contact-arm disposed alongside of the rotor-shaft and resilient supporting-means for said contact-arm, a cam on the shaft for engaging said contact-arm to control said contacts in such relation to the relative positions of the armature with respect to the field-poles that the contacts are opened at times when the torque would otherwise be negative with respect to a desired direction of rotation, a cross-piece means joining the two pole-face members across each side thereof, bearing-members in the two cross-piece means for engaging the shaft on opposite sides of the armature, one of said cross-piece means supporting the resilient supporting-means for the contact-arm, a capacitor spatially disposed between the two side-arms of the field-magnet core and between the coil and the armature, means for electrically connecting said capacitor in a circuit in parallel to said contacts, and means for, in effect, providing wedging-means extending from the cross-piece means to a face of the capacitor to hold the capacitor away from the armature.

2. The invention as defined in claim 1, characterized by the face of the capacitor having raised projections cooperating with said wedging-means to further secure the capacitor in position.

3. A vibrating-contact motor comprising a U-shaped bipolar field-magnet core comprising a bight-portion and two side-arms extending at approximately right angles from the respective ends of the bight-portion, each side-arm terminating in a pole-face member, a field-magnet coil wound upon said bight-portion, a shaft-mounted rotor-armature disposed in operative position between said pole-face members, said rotor-armature being of such magnetic characteristics, and so positioned with respect to said pole-face members, that the torque produced by the action of the field-poles on the armature would be alternately clockwise and counterclockwise if the armature were rotated while the field-magnet coil was continuously energized, a pair of contacts electrically connected in series-circuit relation to the field-magnet coil and mechanically comprising a contact-arm disposed alongside of the rotor-shaft and resilient supporting-means for said contact-arm, a cam on the shaft for engaging said contact-arm to control said contacts in such relation to the relative positions of the armature with respect to the field-poles that the contacts are opened at times when the torque would otherwise be negative with respect to a desired direction of rotation, a cross-piece means joining the two pole-face members across each side thereof, bearing-members in the two cross-piece means for engaging the shaft on opposite sides of the armature, one of said cross-piece means supporting the resilient supporting-means for the contact-arm, means for, in effect, providing a notch-forming shoulder on the inner edge of a cross-piece means close to the inside face of each of the two side-arms of the field-magnet core, a capacitor spatially disposed between the two side-arms of the field-magnet core and between the coil and the armature, means for electrically connecting said capacitor in a circuit in parallel to said contacts, and insulating wedging-means extending from the cross-piece means to a face of the capacitor to hold the capacitor away from the armature, said insulating wedging-means comprising a stiff sheet of insulating-material lying in juxtaposition to the inside face of each of the side-arms of the field-magnet core, each of said insulating sheets being of such width and being so notched as to engage, and be held in place by, its associated notch-forming shoulder of a cross-piece means.

4. The invention as defined in claim 3, characterized by the face of the capacitor having raised projections cooperating with said wedging-means to further secure the capacitor in position, the capacitor-leads being insulated from said field-magnet side-arms by said insulating wedging-means.

5. A vibrating-contact motor comprising a U-shaped bipolar field-magnet core comprising a bight-portion and two side-arms extending at approximately right angles from the respective ends of the bight-portion, each side-arm terminating in a pole-face member, a field-magnet coil wound upon said bight-portion, a shaft-mounted rotor-armature disposed in operative position between said pole-face members, said rotor-armature being of such magnetic characteristics, and so positioned with respect to said pole-face members, that the torque produced by the action of the field-poles on the armature would be alternately clockwise and counterclockwise if the armature were rotated while the field-magnet coil was continuously energized, a pair of contacts electrically connected in series-circuit relation to the field-magnet coil and mechanically comprising a contact-arm disposed alongside of the rotor-shaft and resilient supporting-means for said contact-arm, a cam on the shaft for engaging said contact-arms to control said contacts in such relation to the relative positions of the armature with respect to the field-poles that the contacts are opened at times when the torque would otherwise be negative with respect to a desired direction of rotation, a cross-piece means joining the two pole-face members across each side thereof, bearing-members in the two cross-piece means for engaging the shaft on opposite sides of the armature, one of said cross-piece means supporting the resilient supporting-means for the contact-arm, means for, in effect, providing a notch-forming shoulder on the inner edge of a cross-piece means close to the inside face of each of the two side-arms of the field-magnet core, an insulating barrier-means comprising a stiff sheet of insulating-material lying in juxtaposition to the inside face of each of the side-arms of the field-magnet core and occupying at least a portion of the space between the field-magnet coil and the inner edges of the two cross-piece means, each of said insulating sheets being of such width and being so notched as to engage, and be held in place by, its associated notch-forming shoulder of a cross-piece means, a capacitor spatially disposed between said two insulating sheets and between the coil and the armature, and means for electrically connecting said capacitor in a circuit in parallel to said contacts.

JOHN D. MINER, Jr.